United States Patent [19]

Oshima et al.

[11] Patent Number: 4,684,695

[45] Date of Patent: Aug. 4, 1987

[54] FLAME-RETARDANT, UNSATURATED POLYESTER RESIN AND COMPOSITION THEREFOR

[75] Inventors: Junji Oshima, Toyonaka; Minoru Yamada; Yasuyuki Kajita, both of Kawanishi, all of Japan

[73] Assignee: Takeda Chemical Industries, Ltd., Osaka, Japan

[21] Appl. No.: 796,504

[22] Filed: Nov. 12, 1985

Related U.S. Application Data

[63] Continuation of Ser. No. 651,036, Sep. 14, 1984, abandoned.

[30] Foreign Application Priority Data

Sep. 29, 1983 [JP] Japan ................................ 58-182559

[51] Int. Cl.⁴ ............................................. C08L 67/06
[52] U.S. Cl. ..................................... 525/36; 528/298; 528/299; 528/304
[58] Field of Search ................. 525/36; 528/298, 299, 528/304

[56] References Cited

U.S. PATENT DOCUMENTS

| | | | |
|---|---|---|---|
| 3,536,782 | 10/1970 | Toggweiler | 525/447 |
| 4,148,765 | 4/1979 | Nelson | 428/430 |
| 4,224,430 | 9/1980 | Maekawa | 526/282 |
| 4,246,367 | 1/1981 | Curtis | 525/36 |
| 4,363,907 | 12/1982 | Hefner | 525/287 |

FOREIGN PATENT DOCUMENTS 907245 8/1972 Canada .

OTHER PUBLICATIONS

Nelson, D. L., "Considerations: DCPD in Polyester Resins", 36th Annual Conf., Reinforced Plastics/Composites Inst., The Society of Plastics Industry Inc., Feb. 1981, pp. 1-7.

*Primary Examiner*—John C. Bleutge
*Assistant Examiner*—Patricia Short
*Attorney, Agent, or Firm*—Wenderoth, Lind & Ponack

[57] ABSTRACT

A flame-retardant, unsaturated polyester resin composition comprising a halogen-containing unsaturated polyester obtained by halogenating an unsaturated polyester prepared by the reaction of (a) dicyclopentadiene, (b) α,β-ethylenically unsaturated dicarboxylic acid or its anhydride, (c) tetrahydrophthalic acid or its anhydride and (d) polyhydric alcohol.

Crosslinked products of the composition exhibit increased halogen content and elevated deflection temperature, and are particularly useful for electric appliances, building materials, automobiles, railroad wagons, airplanes, etc.

4 Claims, No Drawings

FLAME-RETARDANT, UNSATURATED POLYESTER RESIN AND COMPOSITION THEREFOR

This application is a continuation of now abandoned application Ser. No. 651,036 filed Sept. 14, 1984.

The present invention relates to flame-retardant, crosslinked unsaturated polyester resin with an increased halogen content and elevated deflection temperature.

Unsaturated polyester resins have been put in wide use as raw materials for electric appliances, building materials, automobiles, railroad wagons, airplanes, etc. In recent years, the requirement of fire retardancy for these raw materials has become increasingly stringent. So as to render unsaturated polyester resins flame-retardant, there have been proposed a process of polycondensation of halogenated dicarboxylic acids with polyhydric alcohols and a method of post-halogenating unsaturated dicarboxylic acids other than $\alpha,\beta$-ethylenically unsaturated ones contained in unsaturated polyesters, whereby the latter is particularly economically favored from the standpoint of cost as compared with the former.

According to the latter method, however, attempts to increase the halogen content with a large amount of unsaturated dicarboxylic acids other than $\alpha,\beta$-ethylenically unsaturated ones for the purpose of attaining an enhanced degree of flame retardancy always result in a reduced concentration of the $\alpha,\beta$-ethylenically unsaturated dicarboxylic acid which acts as a crosslinking point during curing, thus yielding only cured products with lowered deflection temperature. The laminated sheets designed for use in electrically insulating substrates which have low deflection temperature, exhibit greater deterioration in mechanical strength during heating, and cannot be used. On the other hand, an increase in the amount of the $\alpha,\beta$-ethylenically unsaturated dicarboxylic acid in order to achieve higher deflection temperature leads to a decrease in the halogen content and to an insufficient degree of flame retardancy, producing unsaturated polyester resins which can provide merely raw materials failing to pass standards of various requirements for flame retardancy.

The present inventors conducted intensive research on the crosslinked unsaturated polyester resin having excellent flame retardancy while retaining high deflection temperature, and as a result, found that a composition comprising a halogen-containing unsaturated polyester obtained by producing an unsaturated polyester with the combined use of dicyclopentadiene and tetrahydrophthalic acid or its anhydride as a part of the component, followed by the halogenation of said unsaturated polyester, gives the crosslinked product having the excellent properties as described above. The finding has culiminated in the present invention.

Thus, the present invention is directed toward a flame-retardant, unsaturated polyester resin composition, which comprises (1) a halogen-containing unsaturated polyester obtained by halogenating an unsaturated polyester prepared by the reaction of (a) dicyclopentadiene, (b) $\alpha, \beta$-ethylenically unsaturated dicarboxylic acid or its anhydride, (c) tetrahydrophthalic acid or its anhydride and (d) polyhydric alcohol, and (2) a crosslinkable monomer, and toward a flame-retardant, crosslinked unsaturated polyester resin, which has been prepared by crosslinking the above composition.

Dicyclopentadiene, which is useful in the present invention, is highly reactive with dicarboxylic acids and/or polyhydric alcohols, and gives the reaction products having carboxyl groups and/or alcoholic hydroxyl groups. The reaction products contain in the dicyclopentadiene residue the unsaturated bond to which halogens add readily on the occasion of the halogenation to be described later. When the amount of dicyclopentadiene to be used is too much great, there results too much low molecular weight of unsaturated polyester produced, which in some instances makes the cured products too brittle to be practically used. In cases in which the amount of dicyclopentadiene is too much small, the resin with a high halogen content that the present invention has for its object cannot in some instances be obtained. The amount of dicyclopentadiene is in the range of about 20 to 90 mole % against the total acid component, preferably in the range of about 40 to 80 mole %.

As the $\alpha,\beta$-ethylenically unsaturated dicarboxylic acid or its anhydride, by way of example, there may be mentioned maleic acid, maleic anhydride, fumaric acid, mesaconic acid, citraconic acid, citraconic anhydride, itaconic acid, itaconic anhydride, etc., but maleic anhydride and fumaric acid are normally used. Since the said $\alpha,\beta$-ethylenically unsaturated carboxylic acid acts as a crosslinking point on the occasion of curing of unsaturated polyester resin and is closely connected with the deflection temperature, an insufficient quantity of it in some instances fails to produce satisfactory deflection temperature. On the contrary, a large amount of it means that the ratio of unsaturated dicarboxylic acids other than the $\alpha,\beta$-ethylenically one becomes lower, resulting in some instances in reduced flame retardancy. The amount of the $\alpha,\beta$-ethylenically unsaturated dicarboxylic acid is in the range of about 40 to 90 mole % against the total acid component, preferably in the range of about 50 to 70 mole %.

In the present invention, tetrahydrophthalic acid or its anhydride is used as the acid component other than the above-mentioned ones. Said tetrahydrophthalic acid or its anhydride, which each has in the molecule the unsaturated bond easy to be halogenated, contributes to the enhancement of flame retardancy of resins. The amount of tetrahydrophthalic acid or its anhydride to be used is determined depending upon the well balanced combination of flame retardancy and deflection temperature, and is normally in the range of about 10 to 60 mole % against the total acid component, preferably in the range of about 30 to 50 mole %.

As the acid component in addition to the above-mentioned ones, for example, the conventionally known aromatic dicarboxylic acids or aliphatic dicarboxylic acids not having the unsaturated bond, etc. may be used in combination with those as described above.

As the polyhydric alcohol which is useful in the present invention, by way of example, there may be mentioned diols, such as ethylene glycol, diethylene glycol, propylene glycol, dipropylene glycol, neopentyl glycol, 1,3-butanediol, hydrogenated bisphenol A, adducts of bisphenol A with propylene oxide and adducts of bisphenol A with ethylene oxide, and triols, such as glycerol and trimethylolpropane, but with a specific view to the excellent flame retardancy and elevated deflection temperature of the crosslinked product in the present invention, the low-molecular-weight ones such as ethylene glycol are preferable. In cases in which the impact resistance of crosslinked product or solubility in solvents or crosslinkable monomers for unsaturated polyester and so forth are required, it is quite justifiable to employ other polyhydric alcohols solely or in conjunction with the above-mentioned ones.

The amount of the polyhydric alcohol to be used is not more than about 120% in equivalent ratio against that of the carboxyl groups of the total acid component, preferably in the range of about 100 to 110%.

The above-mentioned dicyclopentadiene, $\alpha,\beta$-ethylenically unsaturated dicarboxylic acid or its anhydride, tetrahydrophthalic acid or its anhydride and polyhydric alcohol are allowed to undergo reaction to produce an unsaturated polyester.

The reaction is carried out in accordance with the conventionally known procedure, and the reaction temperature is in the range of about 100° to 220° C., while the reaction time is in the range of about 5 to 15 hours.

The above four components may be reacted simultaneously. In such a case, it is preferred to suppress side reactions such as the Diels-Alder addition reaction between dicyclopentadiene and unsaturated dicarboxylic acid. About 100 to 150 mole % against dicyclopentadiene of dicarboxylic acid and/or polyhydric alcohol may be to allow dicyclopentadiene to undergo reaction in advance at a temperature of not higher than about 160° C., preferably about 110° to 150° C. The latter case is preferable in that the unsaturated bond in the dicyclopentadiene residue can remain unaltered in unsaturated polyester without being impaired by the side reactions as described previously.

When maleic acid or maleic anhydride is used as an $\alpha,\beta$-ethylenically unsaturated dicarboxylic acid or its anhydride, it is recommendable to increase a ratio at which the maleic acid unit in unsaturated polyester rearranges to fumaric acid (fumaric transformation ratio) in order to produce crosslinked products with particularly elevated deflection temperature. As the conditions which facilitate the rearrangement to fumaric acid, by way of example, there may be mentioned (1) raised reaction temperature, (2) increased acidity of system and (3) lowered molecular weight of unsaturated polyester, whereby so as to attain an enhanced fumaric transformation ratio, it is effective to raise up to temperatures as high as about 190° C. to 210° C. in the initial stage of reaction where the acid value is high with the molecular weight being low.

When maleic anhydride or itaconic anhydride is employed as an $\alpha,\beta$-ethylenically unsaturated dicarboxylic acid, the unsaturated polyester having the similar structure can also be formed even by the use of alkylene oxides (e.g., ethylene oxide, propylene oxide, butylene oxide, styrene oxide, epichlorohydrin, etc.) in place of polyhydric alcohols.

The unsaturated polyester obtained by the above procedure is subjected to halogenation. The halogenation reaction is carried out in accordance with the conventionally known methods, and is normally conducted by introducing halogens into the unsaturated polyester in a solvent which does not react easily with halogen. The reaction temperature is not higher than 40° C., particularly preferably not higher than 30° C.

Examples of such solvent include halogenated hydrocarbons such as methylene chloride, chloroform, carbon tetrachloride, chlorofluoromethane, ethylene dichloride and trichloroethane.

This halogenation reaction is an exothermic reaction, and care should be taken in the temperature control not to allow the reaction temperature to exceed 40° C.; otherwise, halogen atoms add to the $\alpha,\beta$-ethylenically unsaturated bond likewise to reduce the crosslinking points during curing, resulting in a decrease in deflection temperature.

As the halogen, use is made of chlorine and/or bromine, and in view of the improved flame retardancy and elevated deflection temperature, bromine is preferred. It does not matter at all even if the halogenation is allowed to proceed until the theoretically equimolar amount of halogen adds to unsaturated bonds other than the $\alpha,\beta$-ethylenically unsaturated one.

After the introduction of halogen, the stirring is continued for a little time, and when a compound capable of capturing free halogen atoms, for example a compound having an oxirane ring, is added at a rate of about 2 to 5 weight % against halogenated unsaturated polyester, coloration disappears; this permits the suppression of colorations in the step of replacement with crosslinkable monomer to be mentioned below as well as during storage of products.

As the compound having the oxirane ring, there may be mentioned for example epichlorohydrin, allylglycidyl ether, butylglycidyl ether, glycidyl acrylate and a variety of epoxy resins represented by bisphenol A diglycidyl ether.

The halogen-containing unsaturated polyester solution thus obtained is freed of solvent by known means such as distillation under reduced pressure, followed by replacement with a crosslinkable monomer to yield the desired unsaturated polyester resin composition.

As the crosslinkable monomer, there may be mentioned for example aromatic vinyl monomers such as styrene, $\alpha$-methylstyrene, chlorostyrene and vinyltoluene and acrylic monomers such as ethyl acrylate, butyl acrylate, methyl methacrylate and ethylene glycol dimethacrylate, but styrene is preferable. In the event flame retardancy is particularly required, chlorostyrene is preferably used. The cross-linkable monomer is added to the halogen-containing unsaturated polyester to a proper degree of viscosity according to the intended end uses of crosslinked product, wherein addition of a large amount of crosslinkable monomer in some instances brings about reduction in the flame retardancy of such crosslinked unsaturated polyester resins. The amount of the crosslinkable monomer to be added is suitably in the range of about 30 to 60 weight % against the halogencontaining unsaturated polyester.

The unsaturated polyester resin composition of the present invention as obtained by the above procedure can be crosslinked by means similar to those employed for conventionally known unsaturated polyester resins, i.e., by adding a radical-forming catalyst or a radical-forming catalyst and an accelerator combinedly to the composition and, if necessary, heating. The composition can be used in a great variety of applications such as paints, castings, resin concrete, putty and fiber-reinforced composites.

As the radical-forming catalyst, by way of example, there may be mentioned organic peroxides, such as cumene hydroperoxide, t-butyl perbenzoate, benzoyl peroxide, methyl ethyl ketone peroxide, t-butyl peroctoate, acetyl acetone peroxide.

The amount of the radical-forming catalyst is in the range of about 0.1 to 5 weight %, preferably 0.5 to 2 weight % against the unsaturated polyester resin composition.

As the accelerator, there may be mentioned for example metal salts such as cobalt naphthenate, cobalt octoate and tertiary amines such as dimethyl aniline and diethyl aniline.

Crosslinked products of the unsaturated polyester resin of the present invention, which exhibit increased halogen content and elevated deflection temperature, are particularly useful for electric appliances, building materials, automobiles, railroad wagons, airplanes, etc.

The examples and reference examples are described below to illustrate the present invention more specifically.

Example 1

(a) Production of an unsaturated polyester resin and dissolution thereof in a solvent.

A four-necked flask of a 5-l capacity fitted with a stirrer, thermometer, tube for blowing nitrogen gas and a series of partial and total condensers is charged with 600 g (6.12 moles) of maleic anhydride, 808 g (6.12 moles) of dicyclopentadiene, 116 g (6.43 moles) of deionized water and 0.14 g of hydroquinone, and the mixture is warmed to 60° C. of the inner temperature by a mantle heater, with stirring, while introducing nitrogen gas at a rate of 0.5 l/min. And power is disconnected to the mantle heater and the flow rate of nitrogen is decreased to 0.1 l/min. By way of a series of exothermic reactions which involve the conversion of maleic anhydride with water into maleic acid and the reaction of the resulting maleic acid with dicyclopentadiene, the inner temperature rises up to 145° C. for a period of 20 minutes. The reaction is furthermore allowed to proceed at a temperature of not lower than 140° C. for 40 minutes to yield a reaction product with an acid value of 222 mg KOH/g. Then, 466 g (3.06 moles) of tetrahydrophthalic anhydride and 399 g (6.43 moles) of ethylene glycol are charged in said flask, and the temperature is raised to 200° C. over a period of 2 hours, while blowing nitrogen gas at a rate of 0.1 l/min. Subsequently, the flow rate of nitrogen is increased to 0.5 l/min, and the polycondensation reaction is carried out at 195° to 200° C. for 6 hours to give 2200 g of an unsaturated polyester resin with 19.8 mg KOH/g of an acid value and 83.2% of a fumaric transformation ratio.

After the unsaturated polyester is cooled to a temperature of not higher than 160° C., the tube for blowing nitrogen gas is removed, and a dropping funnel is attached to the flask, followed by gradual addition of 2000 g of methylene chloride. The methylene chloride distilled through the total condenser is returned to the dropping funnel and added repeatedly to the flask. By this procedure, the unsaturated polyester becomes a uniform methylene chloride solution with a viscosity of not higher than 500 cps, while being cooled.

0.76 g of hydroquinone is added to said solution as a stabilizer.

(b) Halogenation of the unsaturated polyester and replacement with a crosslinkable monomer.

The 5-l flask containing the methylene chloride solution of the unsaturated polyester of (a) is placed on an ice-cooled water bath, and 1467 g (9.18 moles) of bromine is added dropwise, from a dropping funnel, to the solution below the liquid level under stirring. The adding speed is controlled at such a speed as may not exceed 20° C. of the inner temperature. After the addition of bromine, the stirring is continued for 30 minutes, and 60 g of trimethylolpropane triglycidyl ether is added as a stabilizer. The methylene chloride solution of the brominated unsaturated polyester is subjected to simple distillation at a temperature of not higher than 80° C. under reduced pressure to reduce a content of the remainnig methylene chloride to not more than 10 weight %, and 1300 g of styrene is added. Furthermore, 58 g of styrene is distilled off at a temperature of not higher than 80° C. under reduced pressure to yield 4970 g of a brominated unsaturated polyester resin composition having not more than 0.3 weight % of a content of the remaining methylene chloride, 75.0 weight % of a non-volatile content and 29.5 weight % of a bromine content.

REFERENCE EXAMPLE 1

Using a reaction apparatus similar to the one of Example 1, 196 g (2.0 moles) of maleic anhydride, 1218 g (8.0 moles) of tetrahydrophthalic anhydride, 652 g (10.5 moles) of ethylene glycol and 0.14 g of hydroquinone are charged, and nitrogen gas is blown into the flask at a rate of 0.1 l/min. When the temperature of the mixture is allowed to rise to 180° C. under stirring by means of mantle heater and by heat released from the ring-opening reaction of the acid anhydride, the polycondensation reaction starts whereby distillation of the condensation water begins. The temperature is raised up to 200° C. over a period of 20 minutes, and the polycondensation reaction is conducted at 200° to 210° C. for 6 hours while blowing nitrogen gas at a rate of 0.5 l/min. to give 1970 g of an unsaturated polyester with 22.3 mg KOH/g of an acid value and 88.1% of a fumaric transformation ratio.

By following the same procedure as described in Example 1, the unsaturated polyester is dissolved in 2000 g of methylene chloride, and after the addition of 0.76 g of hydroquinone, the bromination reaction is carried out with use of 1278 g (10 moles) of bromine. After the addition of 60 g of trimethylolpropane triglycidyl ether, replacement with styrene is performed by the same procedure as described in Example 1 to yield 4410 g of a brominated unsaturated polyester resin composition having not higher than 0.3 weight % of a content of the remaining methylene chloride, 75.0 weight % of a non-volatile content and 29.0 weight % of a bromine content.

REFERENCE EXAMPLE 2

Using a reaction apparatus similar to the one of Example 1, 477 g (4.86 moles) of maleic anhydride, 927 g (6.09 moles) of tetrahydrophthalic anhydride, 714 g (11.50 moles) of ethylene glycol and 0.14 g of hydroquinone are charged, and by following quite the same procedure as mentioned in Reference Example 1, there is obtained 1910 g of an unsaturated polyester with 20.5 mg KOH/g of an acid value and 87.7% of a fumaric transformation ratio.

By following the same procedure as described in Example 1, the unsaturated polyester is dissolved in 2000 g of methylene chloride, and after the addition of 0.76 g of hydroquinone, the bromination reaction is carried out with use of 973 g (6.09 moles) of bromine. After the addition of 60 g of trimethylolpropane triglycidyl ether, replacement with styrene is performed by the same procedure as described in Example 1 to produce 3920 g of a brominated unsaturated polyester resin composition having not higher than 0.3 weight % of a content of the remaining methylene chloride, 75.0 weight % of a non-volatile content and 24.8 weight % of a bromine content.

EXAMPLES 2-4

By following the same procedure as described in Example 1 except that the charged amounts of each compound in Example 1 are altered as shown below, the polycondensation reactions, halogenations and replacements with styrene are carried out to yield the below-described brominated unsaturated polyester resin compositions as shown in Table 1.

TABLE 1

| | | Example 2 | Example 3 | Example 4 |
|---|---|---|---|---|
| Reaction of dicyclopentadiene and polycarboxylic acid (not higher than 150° C.) | Dicyclopentadiene | 528 g (4.0 mole) | 951 g (7.20 mole) | 880 g (6.67 mole) |
| | Maleic anhydride | 393 g (4.0 mole) | 619 g (6.31 mole) | 409 g (4.17 mole) |
| | Tetrahydrophthalic anhydride | — | 137 g (0.90 mole) | 380 g (2.50 mole) |
| | Deionized water | 72 g (4.0 mole) | 130 g (7.22 mole) | 120 g (6.67 mole) |
| Polycondensation | Maleic anhydride | 98 g (1.0 mole) | — | — |
| | Tetrahydrophthalic anhydride | 761 g (5.0 mole) | 274 g (1.80 mole) | 254 g (1.67 mole) |
| | Ethylene glycol | 522 g (8.4 mole) | 353 g (5.68 mole) | 327 g (5.27 mole) |
| Brominated unsaturated polyester resin composition | The amount of bromine | 1438 g (9.0 mole) | 1582 g (9.90 mole) | 1998 g (12.5 mole) |
| | Non-volatile content (weight %) | 75.0 | 75.0 | 75.0 |
| | Bromine content (weight %) | 29.3 | 30.4 | 35.4 |
| | The amount of the product | 4905 g | 5205 g | 5645 g |

Evaluation of the brominated unsaturated polyester resins:

To each of the brominated unsaturated polyester resins as produced in the above were added 0.4 weight % of 6% cobalt naphthenate and 0.5 weight % of 55% methyl ethyl ketone peroxide, and cast plates having thickness of 3 mm and 10 mm, respectively, were prepared and after-cured at 60° C. for 1 hour and at 100° C. for 3 hours. The cast plates having thickness of 3 mm were cut into test specimens measuring 6.5 mm wide by 100 mm long to measure the oxygen index in accordance with Japanese Industrial Standard K-7201. The cast plates having thickness of 10 mm were cut into test specimens measuring 12.7 mm wide by 127 mm long to measure the deflection temperature in accordance with Japanese Industrial Standard K-6919. The results are shown in Table 2.

TABLE 2

| | Example 1 | Reference Example 1 | Reference Example 2 | Example 2 | Example 3 | Example 4 |
|---|---|---|---|---|---|---|
| Bromine content of the composition (weight %) (Found) | 29.5 | 29.0 | 24.8 | 29.3 | 30.4 | 35.4 |
| The amount of maleic acid of the unsaturated polyester resin composition (Calc.) | 1.67 mmole/g | 0.63 mmole/g | 1.67 mmole/g | 1.39 mmole/g | 1.63 mmole/g | 1.06 mmole/g |
| Oxygen index | 36 | 35 | 27 | 36 | 37 | 40 |
| Deflection temperature | 78° C. | 46° C. | 76° C. | 72° C. | 74° C. | 68° C. |

When the oxygen index is increased to the level of Example 1 by using only unsaturated polycarboxylic acids other than α,β-ethylenically unsaturated ones, the deflection temperature is lowered as is the case with Reference Example 1. To the contrary, elevation of the deflection temperature results in reduction in the oxygen index (Reference Example 2).

It is obvious that crosslinked products from the resin compositions of the present invention excel both in the oxygen index and deflection temperature.

What is claimed is:

1. A flame-retardant, unsaturated polyester resin composition, which comprises (1) a halogen-containing unsaturated polyester obtained by halogenating an unsaturated polyester prepared by the reaction of (a) dicyclopentadiene, its amount being in the range of about 40 to 80 mole % to the total acid component, (b) α,β-ethylenically unsaturated dicarboxylic acid or its anhydride, its amount being in the range of about 40 to 90 mole % of the total acid component, (c) tetrahydrophthalic acid or its anhydride, its amount being in the range of about 10 to 60 mole % of the total acid component and (d) polyhydric alcohol, the reaction being carried out such that about 100 to 150 mole % to dicyclopentadiene of the component (b) or the components (b) and (c) is added to allow dicyclopentadiene to undergo reaction in advance at a temperature of not higher than about 160° C. and then the resulting product is reacted with polyhydric alcohol and the remaining amounts of the component (b) or (c), and (2) a crosslinkable monomer.

2. A flame-retardant, unsaturated polyester resin composition claimed in claim 1, wherein the amount of the component (d) is not more than 120% in equivalent ratio against that of the carboxyl groups of the total acid component.

3. A flame-reatrdant, crosslinked unsaturated polyester resin, which has been prepared by crosslinking a composition comprising (1) a halogen-containing unsaturated polyester obtained by halogenating an unsaturated polyester prepared by the reaction of (a) dicyclopentadiene, its amount being in the range of about 40 to 80 mole % to the total acid component, (b) α,β-ethylenically unsaturated dicarboxylic acid or its anhydride, its amount being in the range of about 40 to 90 mole % of the total acid component, (c) tetrahydrophthalic acid or its anhydride, its amount being in the range of about 10 to 60 mole % of the total acid component and (d) polyhydric alcohol, the reaction being carried out such that about 100 to 150 mole % to dicyclopentadiene of the component (b) or the component (b) and (c) is added to allow dicyclopentadiene to undergo reaction in advance at a temperature of not higher than about 160° C. and then the resulting product is reacted with polyhydric alcohol and the remaining amounts of the component (b) or (c), and (2) a crosslinkable monomer.

4. A flame-retardant, crosslinked unsaturated polyester resin claimed in claim 3 wherein the amount of the component (d) is not more than 120% in equivalent ratio against that of the carboxyl groups of the total acid component.

* * * * *